United States Patent
Hutter et al.

(10) Patent No.: US 10,625,452 B2
(45) Date of Patent: Apr. 21, 2020

(54) INJECTION MOLDING TOOL AND METHOD FOR PRODUCING A MOLDED PART

(71) Applicant: Gerresheimer Regensburg GmbH, Regensburg (DE)

(72) Inventors: Josef Hutter, Geiselhoering (DE); Sandra Lindner, Pfreimd (DE)

(73) Assignee: Gerresheimer Regensburg GmbH, Regensburg (DE)

( * ) Notice: Subject to any disclaimer, the term of this patent is extended or adjusted under 35 U.S.C. 154(b) by 295 days.

(21) Appl. No.: 15/604,691

(22) Filed: May 25, 2017

(65) Prior Publication Data

US 2017/0348889 A1 Dec. 7, 2017

(30) Foreign Application Priority Data

Jun. 2, 2016 (DE) .................. 10 2016 110 168

(51) Int. Cl.
*B29C 45/33* (2006.01)
*B29C 45/80* (2006.01)
(Continued)

(52) U.S. Cl.
CPC ............. *B29C 45/33* (2013.01); *B29C 45/26* (2013.01); *B29C 45/261* (2013.01); *B29C 45/2602* (2013.01); *B29C 45/2628* (2013.01); *B29C 45/2673* (2013.01); *B29C 45/40* (2013.01); *B29C 45/7626* (2013.01); *B29C 45/80* (2013.01); *B29C 2945/7627* (2013.01); *B29C 2945/76096* (2013.01); *B29C 2945/76254* (2013.01); *B29C 2945/76394* (2013.01);
(Continued)

(58) Field of Classification Search
CPC ............. B29C 45/80; B29C 45/2673; B29C 2945/76418; B29C 2945/76394; B29C 2945/7627; B29C 2945/76254; B29C 2945/76096

See application file for complete search history.

(56) References Cited

U.S. PATENT DOCUMENTS 4,824,351 A * 4/1989 Ramsey ................ B22D 17/22
164/137
5,378,422 A 1/1995 Musiel et al.
(Continued)

FOREIGN PATENT DOCUMENTS

| CN | 203185586 U | 9/2013 |
| DE | 692 25 003 T2 | 7/1998 |
| JP | 2014121717 A * | 7/2014 |

OTHER PUBLICATIONS

Chinese First Office Action dated Nov. 28, 2018 in corresponding application 201710408282.2.

*Primary Examiner* — Benjamin A Schiffman
(74) *Attorney, Agent, or Firm* — Muncy, Geissler, Olds & Lowe, P.C.

(57) ABSTRACT

An injection molding tool for producing a molded part and a corresponding method are disclosed. The injection mold tool comprises a first tool mold half and a second tool mold half, which together with a first slider and at least one second slider define a free space for the molded part to be produced. A lever which is pretensioned with an elastic element is assigned to an end switch such that a movable and free end of the lever cooperates with the end switch due to a movement of the first slider.

9 Claims, 3 Drawing Sheets

(51) Int. Cl.
*B29C 45/26* (2006.01)
*B29C 45/40* (2006.01)
*B29C 45/76* (2006.01)
*B29L 23/00* (2006.01)

(52) U.S. Cl.
CPC ............... *B29C 2945/76418* (2013.01); *B29C 2945/76581* (2013.01); *B29L 2023/22* (2013.01)

(56) References Cited

U.S. PATENT DOCUMENTS

| | | | | |
|---|---|---|---|---|
| 5,814,356 A * | 9/1998 | Ito | ......................... | B29C 45/006 |
| | | | | 425/556 |
| 8,147,238 B1 * | 4/2012 | Zou | ..................... | B29C 45/4421 |
| | | | | 425/438 |
| 2017/0282423 A1 * | 10/2017 | Murata | ............... | B29C 45/7653 |
| 2019/0155247 A1 * | 5/2019 | Sato | ....................... | B22D 17/26 |

* cited by examiner

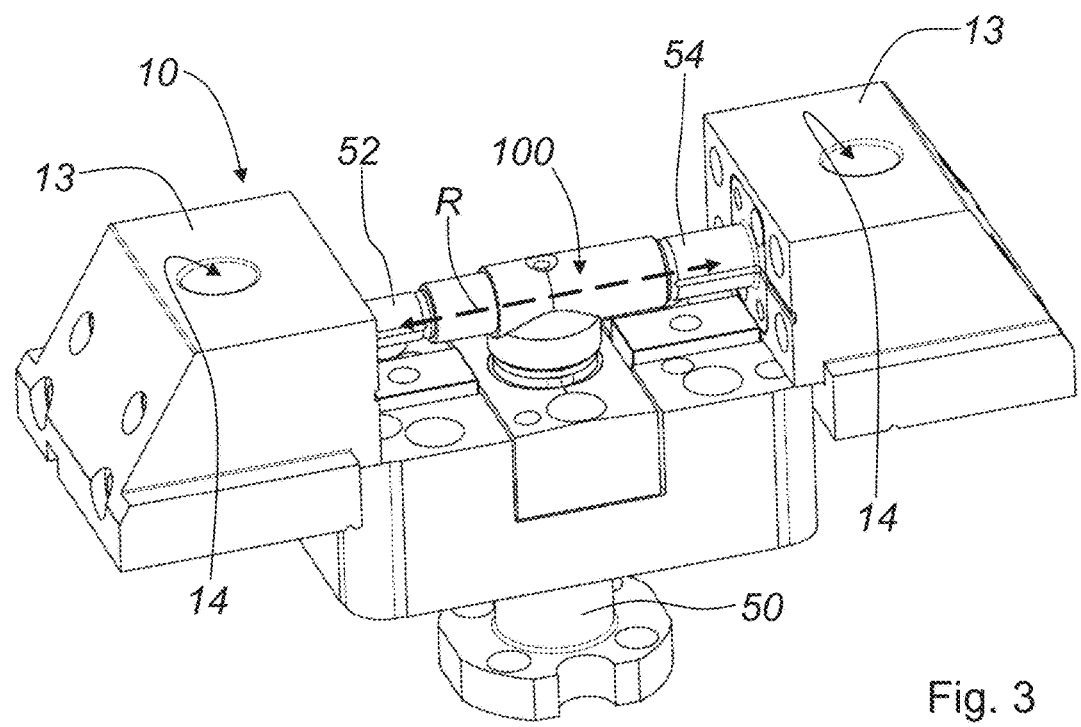
Fig. 3
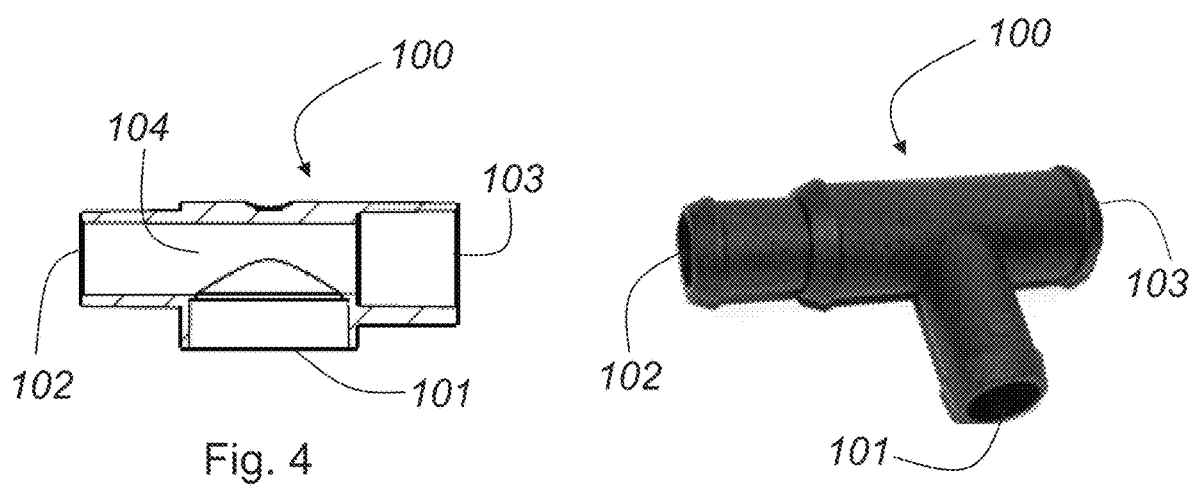
Fig. 4
Fig. 5

INJECTION MOLDING TOOL AND METHOD FOR PRODUCING A MOLDED PART

This nonprovisional application claims priority under 35 U.S.C. § 119(a) to German Patent Application No. 10 2016 110 168.0, which was filed in Germany on Jun. 2, 2016, and which is herein incorporated by reference.

BACKGROUND OF THE INVENTION

Field of the Invention

The invention relates to an injection molding tool for producing a molded part. In particular, the injection molding tool comprises a first tool mold half and a second tool mold half which, together with a first slider and at least one second slider, define a free space for the molded part to be produced. The first slider has a front topology. Likewise, the second slider has formed an edge topology. The front topology of the first slider thereby lies fully against the edge topology of the second slider when the first slider and the second slider have entered the injection mold tool. An end switch is used to determine a distance between the front topology of the first slider and the edge topology of the second slider.

The invention also relates to a method for producing a molded part. To produce the molded part, an injection molding tool is used which has at least one first tool mold half and at least one second mold half which are arranged opposite one another.

Description of the Background Art

In the injection molding tools used in prior art techniques for producing a T-shaped part, a core arranged on the side of an ejector was drawn by approximately 0.2 mm. For this purpose, compression springs in the injection mold tool are pushed forward by 0.2 mm. A gap of 0.2 mm is also created between the slide core and the core on the side of the ejector. Once the gap has been achieved, the slider can then be moved out of the plastic part without damage. However, if there is a disturbance of this movement by the distance of 0.2 mm, the slide core slides on the core on the side of the ejector. Since the surfaces of the cores or sliders are highly polished, this sliding together leads to scratches and scuffs. In order to prevent this, a switch is used to determine whether the tool has actually moved a distance of 0.2 mm at each cycle.

The switches customary in tool construction are ideally suited for use in a harsh production environment (injection molding). In order to be able to reliably evaluate a switching signal from these switches, the switching element must cover at least one specific working distance or target distance. This is indicated with 0.2 to 0.5 mm. This means that these switches only detect movements which are greater than 0.5 mm.

SUMMARY OF THE INVENTION

It is therefore an object of the invention to provide an injection molding tool which has a high level of stability, so that a high-quality injection molding of a plurality of molded parts over a longer period of time is provided.

It is also an object of the invention to provide a method for producing a molded part by means of an injection molding tool, the injection molding tool maintaining a high stability, so that a high-quality injection molding of a plurality of molded parts over a longer period of time is possible.

According to an exemplary embodiment of the invention, the injection molding tool for producing a molded part comprises a first tool half and a second tool half. A free space for the molded part to be produced is defined together with a first slider and at least one second slider. The first slider has formed a front topology. The second slider has formed an edge topology. During the injection molding of the molded part, the front topology of the first slider lies fully against the edge topology of the second slider. This is the case when the first slider and the second slider are inserted into the injection mold. An end switch is used to determine a distance between the front topology of the first slider and the edge topology of the second slider. The determination of the distance is necessary in order to ensure safe and damage-free separation of the first slider and the second slider. When the first slider and the second slider move apart, there is to be no damage to the front topology of the first slider or the edge topology of the second slider. In order to ensure a damage-free moving apart of the first slider and the second slider, a lever pretensioned with an elastic element is provided, which lever is assigned to an end switch. For this purpose, a movable free end of the lever cooperates with the end switch.

The first slider is coupled to the pretensioned lever. The movement of the first slider causes a distance between the front topology of the first slider and the edge topology of the second slider. This distance is transmitted by means of the movable free end of the lever into a distance from the free end of the lever to the end switch.

The lever is used to transmit the distance between the front topology of the first slider and the edge topology of the second slider into a greater distance between the movable and free end of the first lever relative to the end switch.

According to an embodiment of the invention, the lever is configured such that e.g. a distance between the front topology of the first slider and the edge topology of the second slider being less than 0.5 mm, in particular 0.2 mm, is transmitted into a distance between the movable free end of the lever and the end switch being greater than 0.5 mm, in particular 0.95 mm.

In an embodiment, the elastic element pretensioning the lever can be a coil spring.

According to an embodiment of the invention, a third slider is provided for the injection molding tool. By the cooperation of the first slider, the second slider and the third slider in the injection molding tool, it is thus possible to produce a T-shaped pipe piece. The free space for the molded part to be produced is defined together with the first tool mold half, the second tool mold half, the first slider and the second slider.

An advantage of the invention is that a reliable determination of a target distance between the front topology of the first slider and the edge topology of the second slider is possible. It is only by means of this safe determination of the target distance that it is possible for the first slider and the second slider to move apart without damage. This ensures that the edge topology of the second slider does not slide on the front topology of the first slider during disassembly and thus leads to damage. As a result of this, an injection molding tool is obtained which has a considerable stability and thus provides a tool with which high-quality molded parts can be produced by means of an injection molding process.

With the method according to the invention for producing a molded part in an injection molding tool, it is possible to produce molded parts with high quality over a longer period of time. The method comprises a plurality of steps. At first, the injection mold tool is closed, so that the first tool mold half and the second mold half are arranged opposite one another. Then, the first slider and at least one second slider are inserted into the first tool mold half and into the second tool mold half. This creates a free space for the molded part to be produced. When the first slider and the second slider are inserted into the first tool mold half and into the second tool mold half, a front topology of the first slider fully lies against an edge topology of the second slider. Subsequently, an injection molding of a liquefied material into the free space is carried out, thus forming the molded part. Before the molded part can be ejected from the injection mold, it is necessary that the front topology of the first slider be separated from the edge topology of the second slider or that they can be moved apart at a distance. The first slider is coupled to a pretensioned lever in order to ensure a sufficient distance between the first slider and the second slider. By means of the pretensioned lever, which cooperates with an end switch, it is thus possible to determine a target distance between the front topology of the first slider and the edge topology of the second slider. With a movable end of the pretensioned lever, the target distance at an end switch is transmitted into a greater distance. As a result of the transmission into the greater distance, it is then ensured that the target distance is achieved, so that a complete withdrawal of the first slider and of the at least one second slider is possible without damage. Finally, the injection mold tool is opened and the molded part is ejected.

According to an embodiment of the invention, the target distance between the front topology of the first slider and the edge topology of the second slider should be at least 0.2 mm. The pretensioned lever is configured in such a way that the greater value of the target distance between the movable end of the pretensioned lever and the end switch is 0.95 mm.

With the transmission through the pretensioned lever, the movable end of which cooperates with the end switch, it can be ensured that the required target distance between the front topology of the first slider and the edge topology of the second slider is achieved. It is thus possible to ensure that the first slider and the second slider are moved apart without damage and thus no slipping or grinding of the front topology of the first slider and the edge topology of the second slider is possible.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 is a perspective view of the injection molding tool according to the invention, in which the first and second tool mold halves are omitted;

FIG. 4 is a view in cross-section of a molded part, which is a T-piece, produced with the invention;

FIG. 5 is a perspective view of the molded part produced with the injection molding tool according to the invention;

DETAILED DESCRIPTION

Figure 1:
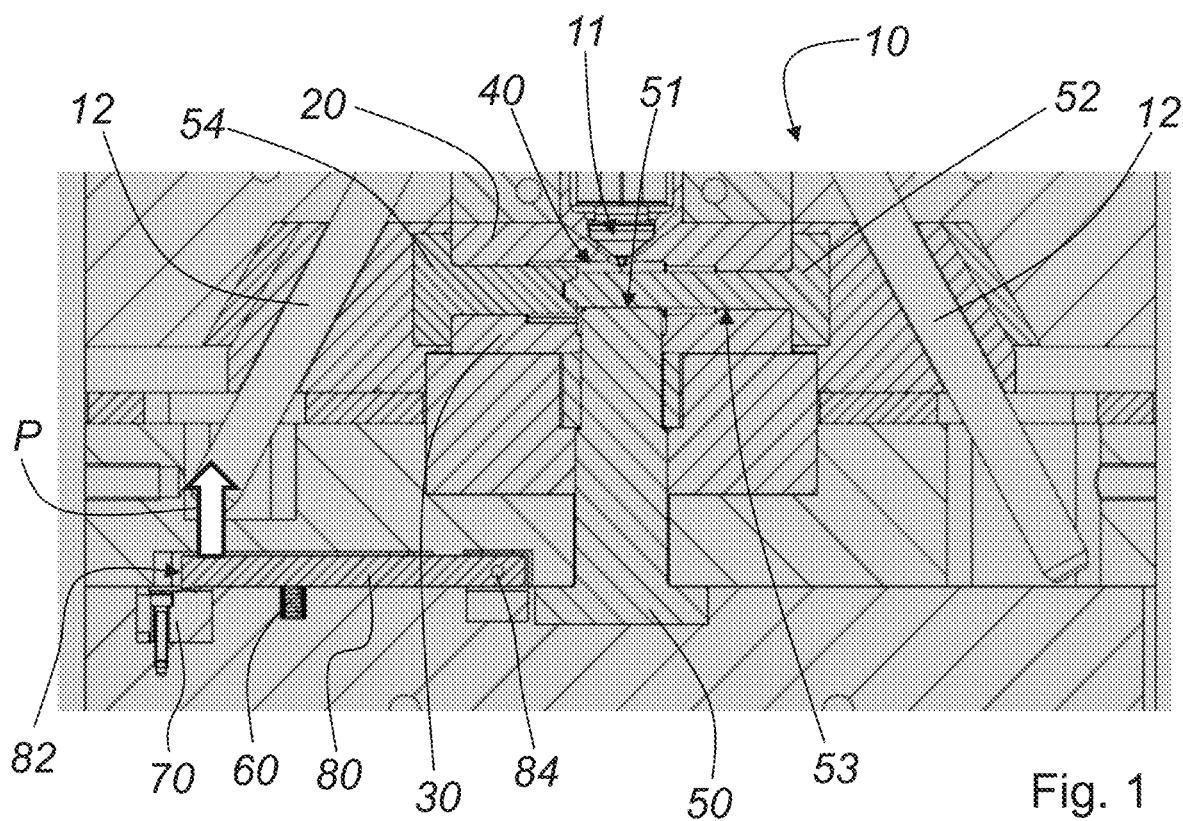
FIG. 1 shows a cross-section through the injection molding tool according to the invention.

FIG. 1 shows a cross-section through an injection molding tool 10, in which a pretensioned lever 80 cooperates with an end switch 70. Molded parts 100 (see FIGS. 4 and 5) are produced with the injection molding tool 10 according to the invention. In the embodiment described here, the injection molding tool 10 comprises a first tool mold half 20 and a second tool mold half 30. A first slider 50, a second slider 52 and a third slider 54 are inserted into the tool mold halves 20, 30. The first slider 50, the second slider 52 and the third slider 54, together with the first tool mold half 20 and the second tool mold half 30, form a free space 40. Said free space 40 serves to form the molded part 100 which is to be produced by the injection molding process. In the inserted state, a front topology 51 of the first slider 50 is engaged with an edge topology 53 of the second slider 52 in a form-fit manner. A front end 55 (see FIG. 2) of the second slider 52 abuts a front end 57 (see FIG. 2) of the third slider 54. The positioning of the first slider 50, the second slider 52 and the third slider 54 against each other is necessary in order that the liquefied material is distributed exclusively in the free space 40 during the injection molding process and the injection molding tool 10 is not soiled.

By means of at least one nozzle 11, the liquefied material is injected into the free space 40 during the injection molding process. The liquefied material fills the free space 40 and thereby forms the desired molded part 100. After the injection molding process has been completed and the molded part 100 has been solidified in the injection molding tool 10, the molded part 100 has to be removed from the injection molding tool 10. For this purpose, it is necessary for the first slider 50, the second slider 52 and the third slider 54 to be moved out of the at least one first tool mold half 20 and the at least one second tool half 30. Since the front topology 51 of the first slider 50 and the edge topology 53 of the second slider 52 are in contact during the injection molding process, it is required that the front topology 51 and the edge topology 53 are separated from each other by a certain distance (target distance) before the first slider 50 and the second slider 52 can be fully withdrawn.

In this case, however, it must be ensured that a predefined target distance is also achieved when the first slider 50 and the second slider 52 are pulled out of the injection molding tool 10.

In order to determine that the predefined target distance between the front topology 51 of the first slider 50 and the edge topology 53 of the second slider 52 has been achieved, a pretensioned lever 80 is assigned to the first slider 50. The pretensioned lever 80 is pretensioned with an elastic element 60. A movable and free end 82 of the lever 80 cooperates with an end switch 70. The pretensioned lever 80 is pivotable via an axis of rotation 84.

If the first slider 50 moves away from the second slider 52, a distance 56 (see FIG. 7) between the front topology 51 of the first slider 50 and the edge topology 53 of the second slider 52 is established. Because the first slider 50 is associated with the pretensioned lever 80, the pretensioned lever 80 pivots about the axis 84. The pivoting movement of the pretensioned lever 80 in the direction of the arrow P is supported by the elastic element 60. Because of the pivoting movement of the pretensioned lever 80, the movable end 82 of the pretensioned lever 80 moves away from the end switch 70. Due to the design of the pretensioned lever 80, the current distance 56 between the front topology 51 of the first slider 50 and the edge topology 53 of the second slider 50 is thus transmitted into a distance 58 (see FIG. 7), which is greater than the current distance 56 between the front topology 51 of the first slider 50 and the edge topology 53 of the second slider 52. By means of the pretensioned lever 80, it is thus possible to enable a clear determination of a target distance 56 so as to allow the first slider 50 and the second slider 52 to be pulled apart without damage.

Figure 2:
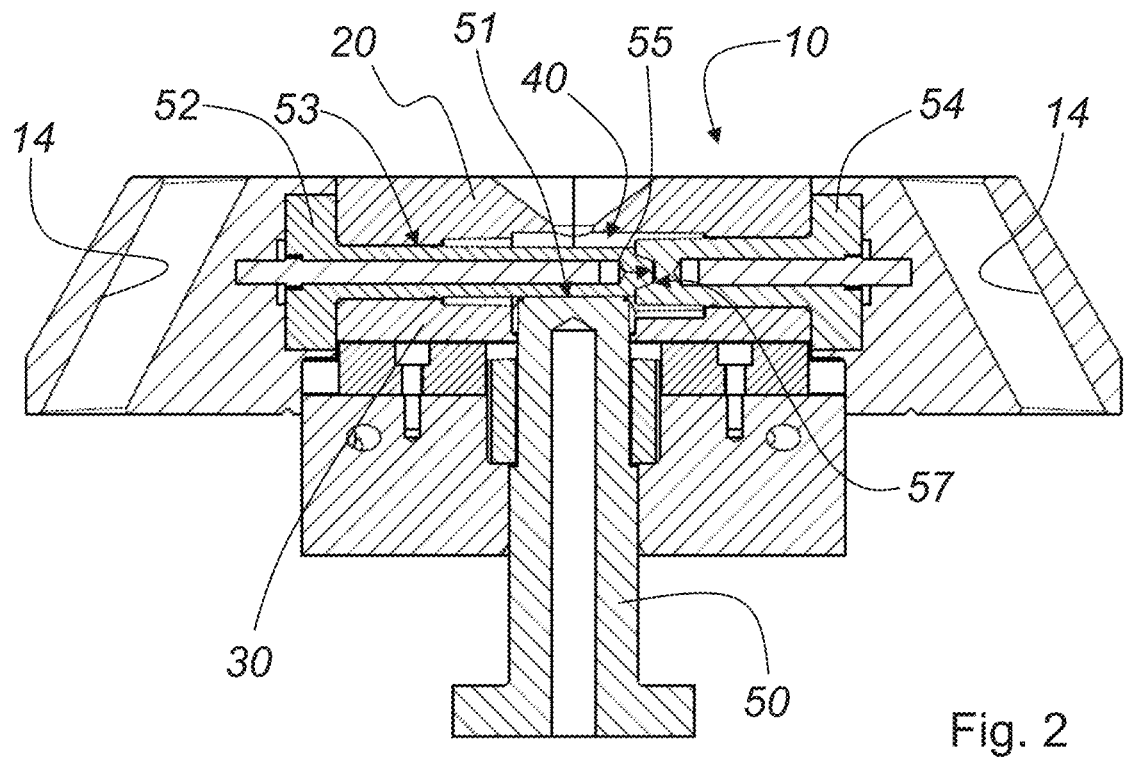
FIG. 2 is a cross-sectional view through the injection molding tool according to the invention, in which some of the components have been omitted in comparison to FIG. 1.

FIG. 2 also shows a cross-section through the injection molding tool 10, some parts of the injection molding tool 10 being omitted in order to better illustrate the cooperation of the first slider 50, the second slider 52 and the third slider 54. A free space 40 is defined by the first slider 50, second slider 52 and third slider 54 inserted into the at least one first tool half 20 and the at least one second tool half 30. The free space 40 is filled with a liquefied material by injection molding, so that the desired molded part 100 (see FIGS. 4 and 5) is thereby formed. In the injection molding tool 10 shown in FIG. 2, molded parts are produced, which are a T-shaped pipe piece. In order to form the free space 40, a front topology 51 of the first slider 50 rests against an edge topology 53 of the second slider 52. Likewise, a front end 55 of the second slider 52 engages in a front end 57 of the third slider 54. For the high-quality production of the molded parts 100, it is essential that the front topology 51 of the first slider 50 is fitted tightly and positively on the edge topology 53 of the second slider 52. Also, it is a requirement that the front end 55 of the second slider 52 engages tightly and positively into the front end 57 of the third slider 54.

FIG. 3 shows a perspective view of the injection molding tool 10, in which the at least one first tool mold half 20 and the at least one second tool mold half 30 are omitted. The molded part 100 is still held by the first slider 50, the second slider 52 and the third slider 54. The second slider 52 and the third slider 54 are each held in a slide block 13. An inclined bore 14 is formed in each slide block 13. A respective rod 12 (see FIG. 1) engages in the inclined bore 14, by means of which respective rod 12 the movement of the second slider 52 and the movement of the third slider 54 in the linear direction R can be initiated with respect to the molded part 100. When the rods 12 (see FIG. 1) are lowered into the respective inclined bores 14 of the slide blocks 13, the first slider 52 and the third slider 54 move towards each other until ultimately the front end 55 (see FIG. 2) of the second slider 52 engages into the front end 57 (see FIG. 2) of the third slider 54 in a form-fitting manner. The third slider 54 comes from the bottom in operative connection with the edge topology 53 (see FIG. 2) of the second slider 52.

FIG. 4 shows a sectional view through the molded part 100 which has been produced with the injection molding tool 10 described in FIGS. 1 to 3. The molded part 100 is a T-piece. By the cooperation of the first slider 50, the second slider 52 and the third slider 53, a passage 104 is formed in the T-piece 100. The T-piece has a first access 101 by the first slider 50, a second access 102 by the second slider 52, and a third access 103 by the third slider 53.

Likewise, the embodiment of the molded part 100 shown in FIG. 5 has a first access 101, a second access 102 and a third access 103.

Figure 6:
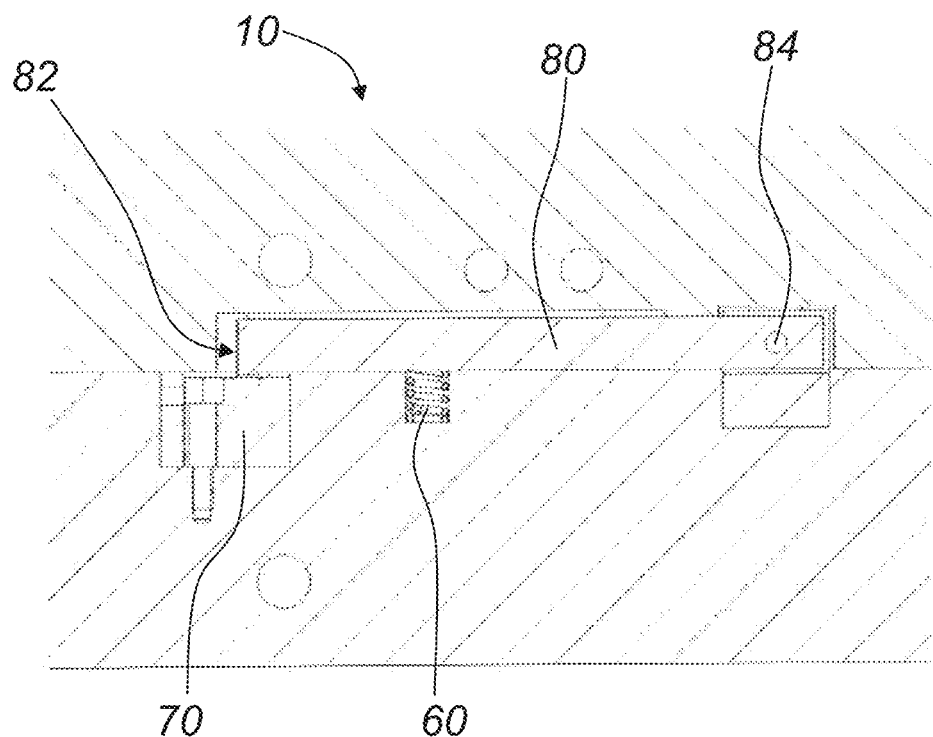
FIG. 6 is an enlarged view of the pretensioned lever in the injection molding tool.

FIG. 6 shows an enlarged view of the pretensioned lever 80 in the injection molding tool 10. In the situation shown here, the injection molding tool 10 is closed and the movable end 82 cooperates with the end switch 70. The pretensioned lever 80 is pivotable about an axis 84. The pivotal movement of the pretensioned lever 80 is supported by an elastic element 60, which is a spiral spring.

Figure 7:
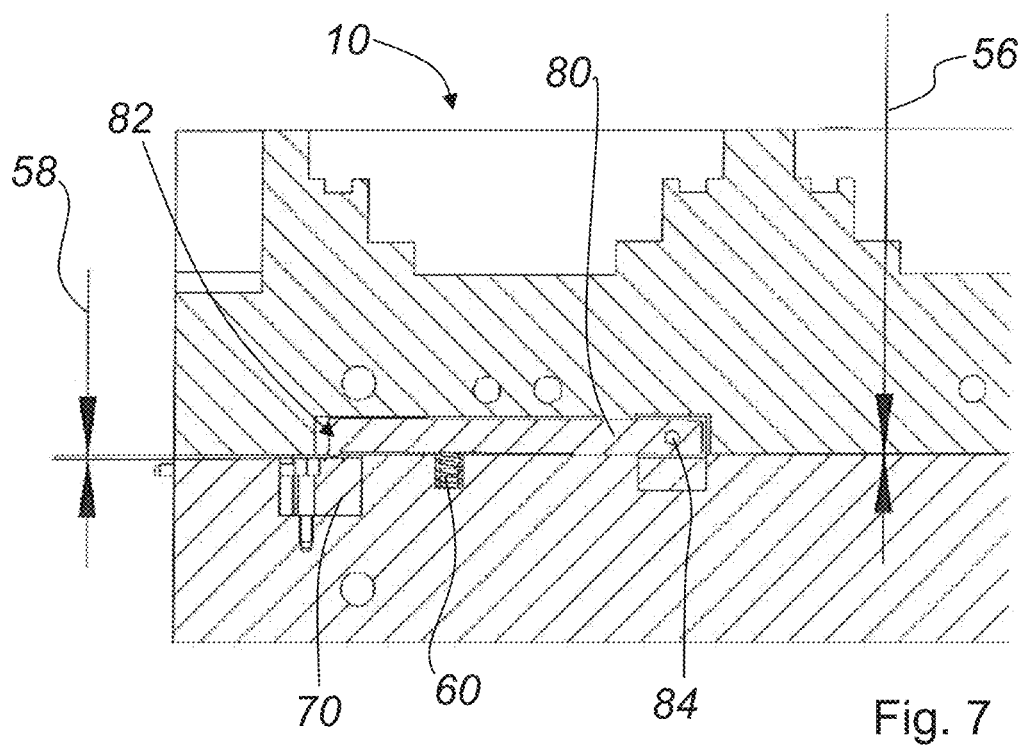
FIG. 7 is an enlarged view of the pretensioned lever in the injection molding tool, in which the transmission of the target distance into a greater distance between the end switch and the movable end of the pretensioned lever is shown.

FIG. 7 shows the situation in which the opening process of the injection molding tool 10 has begun. In the embodiment described here, therefore, the front topology 51 of the first slider 50 has separated from the edge topology 53 of the second slider 52. As a result, a distance 56 between the front topology 51 of the first slider 50 and the edge topology 53 of the second slider 52 has been set. By means of the set distance 56, it is thus possible for the pretensioned lever 80 to pivot about the axis 84. Due to the pivoting movement, the movable end 82 of the pretensioned lever 80 moves away from the end switch 70. Due to the lever conditions, a distance 58 is established between the movable end 82 of the pretensioned lever 80 and the end switch 70, which is greater than the distance 56. By means of this transmission of the current distance 56 into a transmitted distance 58 due to the lever 80, it is thus possible to ensure that a certain target distance 56 between the front topology 51 of the first slider 50 and the edge topology 53 of the second slider 52 is achieved. As already mentioned, it is only possible when the target distance 56 is achieved that the first slider 50 and the second slider 52 can be pulled apart from each other orthogonally without damage. The pretensioned lever 80 is mechanically configured in such a way that, at a distance 56 of 0.2 mm, a distance 58 between the movable and free end 82 of the lever 80 to the end switch 70 of 0.95 mm results.

The exemplary embodiment described herein describes an injection molding tool with three sliders, which are inserted into corresponding tool mold halves in order to produce a molded part by means of an injection molding process. It is obvious to a person skilled in the art that the invention is not limited to the use of three sliders.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. An injection molding tool for producing a molded part, the injection molding tool comprising:
 a first tool mold half and a second tool mold half that, together with a first slider and at least one second slider, define a free space for the molded part to be produced;
 a front topology formed on the first slider;
 an edge topology formed on the second slider, wherein at least a substantial portion of the front topology of the first slider lies fully against the edge topology of the second slider when the first slider and the second slider have entered the injection mold tool;
 an end switch configured to determine a distance between the front topology of the first slider and the edge topology of the second slider; and a lever that is pretensioned with an elastic element and is assigned to the end switch such that a movable and free end of the lever interacts with the end switch,
wherein the first slider is coupled to the pretensioned lever so that the distance between the front topology of the first slider and the edge topology of the second slider results in a distance of the movable and free end of the lever to the end switch.

2. The injection molding tool as claimed in claim 1, wherein the lever transmits the distance between the front topology of the first slider and the edge topology of the second slider into a greater distance between the movable and free end of the lever to the end switch.

3. The injection molding tool as claimed in claim 2, wherein the lever is configured such that a distance of less than 0.5 mm or 0.2 mm between the front topology of the first slider and the edge topology of the second slider is transmittable into a distance of greater than 0.5 mm or 0.95 mm between the movable and free end of the lever to the end switch.

4. The injection molding tool as claimed in claim 1, wherein said elastic element is a spiral spring.

5. The injection molding tool as claimed in claim 1, wherein a third slider is provided which, together with the first tool mold half, the second tool mold half, the first slider and the second slider defines the free space for the molded part to be produced.

6. A method for producing a molded part in an injection molding tool, the method comprising:
closing the injection mold tool so that a first tool mold half and a second tool mold half are arranged opposite one another;
inserting a first slider and at least one second slider into the first tool mold half and the second tool mold half, wherein a free space for the molded part to be produced is defined and at least a substantial portion of a front topology of the first slider lies fully against an edge topology of the second slider when the first slider and the second slider have entered the injection mold;
injection molding a liquefied material into the free space to form the molded part;
removing the front topology of the first slider from the edge topology of the second slider, the first slider being coupled to a pretensioned lever, the pretensioned lever being pretensioned with an elastic element;
determining, via an end switch of the injection molding tool, a target distance between the front topology of the first slider and the edge topology of the second slider, wherein the target distance is transmitted into a greater distance at the end switch through a movable free end of the pretensioned lever;
fully removing the first slider and the at least one second slider when the target distance is measured via the transmission by the lever; and
opening the injection mold tool to facilitate an ejection of the molded part,
wherein the first slider is coupled to the pretensioned lever so that the target distance between the front topology of the first slider and the edge topology of the second slider results in a distance of the movable free end of the lever to the end switch.

7. The method as claimed in claim 6, wherein the target distance between the front topology of the first slider and the edge topology of the second slider is at least 0.2 mm.

8. The method as claimed in claim 6, wherein an increased value of the target distance between the front topology of the first slider and the edge topology of the second slider is measured with the end switch via the movable end of the pretensioned lever.

9. The method as claimed in claim 8, wherein the increased value of the target distance is at least 0.5 mm or 0.95 mm.

* * * * *